(12) United States Patent
Kubo et al.

(10) Patent No.: US 11,206,335 B2
(45) Date of Patent: Dec. 21, 2021

(54) INFORMATION PROCESSING APPARATUS, METHOD AND NON-TRANSITORY COMPUTER READABLE MEDIUM

(71) Applicant: FUJIFILM Business Innovation Corp., Tokyo (JP)

(72) Inventors: Shusaku Kubo, Kanagawa (JP); Kunihiko Kobayashi, Kanagawa (JP); Kunikazu Ueno, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/744,205

(22) Filed: Jan. 16, 2020

(65) Prior Publication Data

US 2021/0067640 A1  Mar. 4, 2021

(30) Foreign Application Priority Data

Sep. 2, 2019  (JP) .............................. JP2019-159616

(51) Int. Cl.
*H04N 1/00* (2006.01)
*G06F 16/532* (2019.01)
*G06F 16/583* (2019.01)

(52) U.S. Cl.
CPC ....... *H04N 1/00336* (2013.01); *G06F 16/532* (2019.01); *G06F 16/5846* (2019.01); *H04N 1/00331* (2013.01); *G06F 16/5838* (2019.01); *G06F 16/5854* (2019.01)

(58) Field of Classification Search
None
See application file for complete search history.

(56) References Cited

U.S. PATENT DOCUMENTS

| 2010/0325688 A1* | 12/2010 | Kakehi | H04L 63/105 |
| | | | 726/1 |
| 2010/0325690 A1* | 12/2010 | Suzuki | H04N 1/00832 |
| | | | 726/1 |
| 2014/0229817 A1* | 8/2014 | Afram | G06F 40/106 |
| | | | 715/230 |

FOREIGN PATENT DOCUMENTS

| JP | H06162107 | 6/1994 |
| JP | H11224256 | 8/1999 |
| JP | 2001337993 | 12/2001 |
| JP | 2010-205060 | 9/2010 |
| JP | 2010-286882 | 12/2010 |
| JP | 2018-092459 | 6/2018 |

\* cited by examiner

*Primary Examiner* — Frantz Bataille
(74) *Attorney, Agent, or Firm* — JCIPRNET (57) ABSTRACT

An information processing apparatus includes a processor. The processor is configured to identify a type of a target document to be processed from a read image obtained by reading the target document; refer to specific-character information, the specific-character information being information on a specific character set for each type of document in association with a specific image that is to be contained in the document, to obtain a specific character corresponding to the type of the target document and associated with a specific image that is to be contained in the target document; and determine whether an image that matches a search condition set in advance for the obtained specific character is extractable from the read image, to determine a presence or absence of a specific image that is to be contained in the target document in association with the obtained specific character.

7 Claims, 6 Drawing Sheets

| DOCUMENT TYPE | KEY |
|---|---|
| DRAWING | APPROVER, DRAFT, CONSTRUCTION, DESIGN, CHECK |
| INVOICE | SENDER, AMOUNT, DATE |
| ⋮ | ⋮ |

FIG. 4

| KEY | SEARCH CONDITION | |
|---|---|---|
| | CONDITION FOR IMAGE | POSITIONAL RELATIONSHIP |
| APPROVER | RED-COLORED CIRCLE, NAME OF PERSON | WITHIN 3 cm BELOW |
| DRAFT | RED-COLORED CIRCLE, NAME OF PERSON | WITHIN 3 cm BELOW |
| CONSTRUCTION | RED-COLORED CIRCLE, NAME OF PERSON | WITHIN 3 cm BELOW |
| DESIGN | RED-COLORED CIRCLE, NAME OF PERSON | WITHIN 3 cm BELOW |
| CHECK | RED-COLORED CIRCLE, NAME OF PERSON | WITHIN 3 cm BELOW |

| |
|---|
| PERSONAL SEAL |
| CORPORATE SEAL |
| DATA SEAL |
| SIGNATURE (HANDWRITTEN-CHARACTER IMAGE) |
| LOGO (PICTOGRAM) |
| CHARACTERS (OCR PROCESSING AREA) |
| FIGURE (BOX) |
| FIGURE (WHITE CIRCLE) |
| FIGURE (LEADER LINE) |
| PICTURE |

FIG. 8

| CONDITION ITEM | ITEM VALUE |
|---|---|
| COLOR | SPECIFY COLOR (SET CERTAIN COLOR RANGE FOR EACH OF RGB 256 LEVELS) |
| POSITION RELATIVE TO KEY | TO RIGHT, LEFT, OR ABOVE OR BELOW (360-DEGREE), AND DISTANCE |
| SIZE | SIZE |
| TARGET SHAPE | CIRCLE, RECTANGLE |
| IMAGE CONDITION | PERSONAL SEAL (CIRCLE AND CHARACTERS), CORPORATE SEAL (RECTANGLE AND CHARACTERS), DATA SEAL (CIRCLE, CHARACTERS, AND DATE), SIGNATURE (LINE) |
| OCR PROCESSING | APPLICATION OF OCR AND MATCHING IN TEXT |
| COMPOUND CONDITION | COMBINE MULTIPLE CONDITIONS AMONG ABOVE CONDITIONS, SUCH AS RED-COLORED CHARACTERS INSIDE CIRCLE |

INFORMATION PROCESSING APPARATUS, METHOD AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-159616 filed Sep. 2, 2019.

BACKGROUND

(i) Technical Field

The present disclosure relates to an information processing apparatus and a non-transitory computer readable medium.

(ii) Related Art

Image search techniques have been generalized in recent years for searching for an image by specifying a search word in a way similar to that for a character string. For example, a technique for specifying a keyword for an image has been proposed (e.g., Japanese Unexamined Patent Application Publication No. 2010-205060). This technique extracts, from a document containing character strings and images, words having high feature levels as keywords from paragraphs describing each image extracted from the document, generates indices of keywords for the images included in the document, and retrieves an image corresponding to a keyword in the indices that matches an input search word. A technique has also been proposed (e.g., Japanese Unexamined Patent Application Publication No. 11-224256). This technique analyzes hypertext markup language (HTML) text to assign scores to words for each piece of image information such that a higher score is assigned to a word nearer the piece of image information, and displays pieces of image information related to words that match a specified search key in descending order from the highest score.

Further examples of the related art are shown in the following publications: Japanese Unexamined Patent Application Publication Nos. 2001-337993, 6-162107, 2010-286882, and 2018-092459.

The techniques of the related art are based on the assumption that a document or the like contains an image, and a keyword or the like is used to search for the image. However, a user sometimes desires to determine whether a document contains a specific image that is to be contained in the document, for example, a seal (or stamp) that is to be affixed to the document, in association with a predetermined keyword. In this case, the user opens a document file to display the document on a screen, and determines whether the image is contained in the document.

SUMMARY

However, opening a document file and displaying a document to determine the presence or absence of a specific image that is to be contained in the document are time and labor consuming.

Aspects of non-limiting embodiments of the present disclosure relate to a technique for determining the presence or absence of a specific image that is to be contained in a document without opening a document file.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor. The processor is configured to identify a type of a target document to be processed from a read image obtained by reading the target document; refer to specific-character information, the specific-character information being information on a specific character set for each type of document in association with a specific image that is to be contained in the document, to obtain a specific character corresponding to the type of the target document and associated with a specific image that is to be contained in the target document; and determine whether an image that matches a search condition set in advance for the obtained specific character is extractable from the read image, to determine a presence or absence of a specific image that is to be contained in the target document in association with the obtained specific character.

BRIEF DESCRIPTION OF THE DRAWINGS

An exemplary embodiment of the present disclosure will be described in detail based on the following figures, wherein.

DETAILED DESCRIPTION

The following describes an exemplary embodiment of the present disclosure with reference to the drawings.

Figure 1:
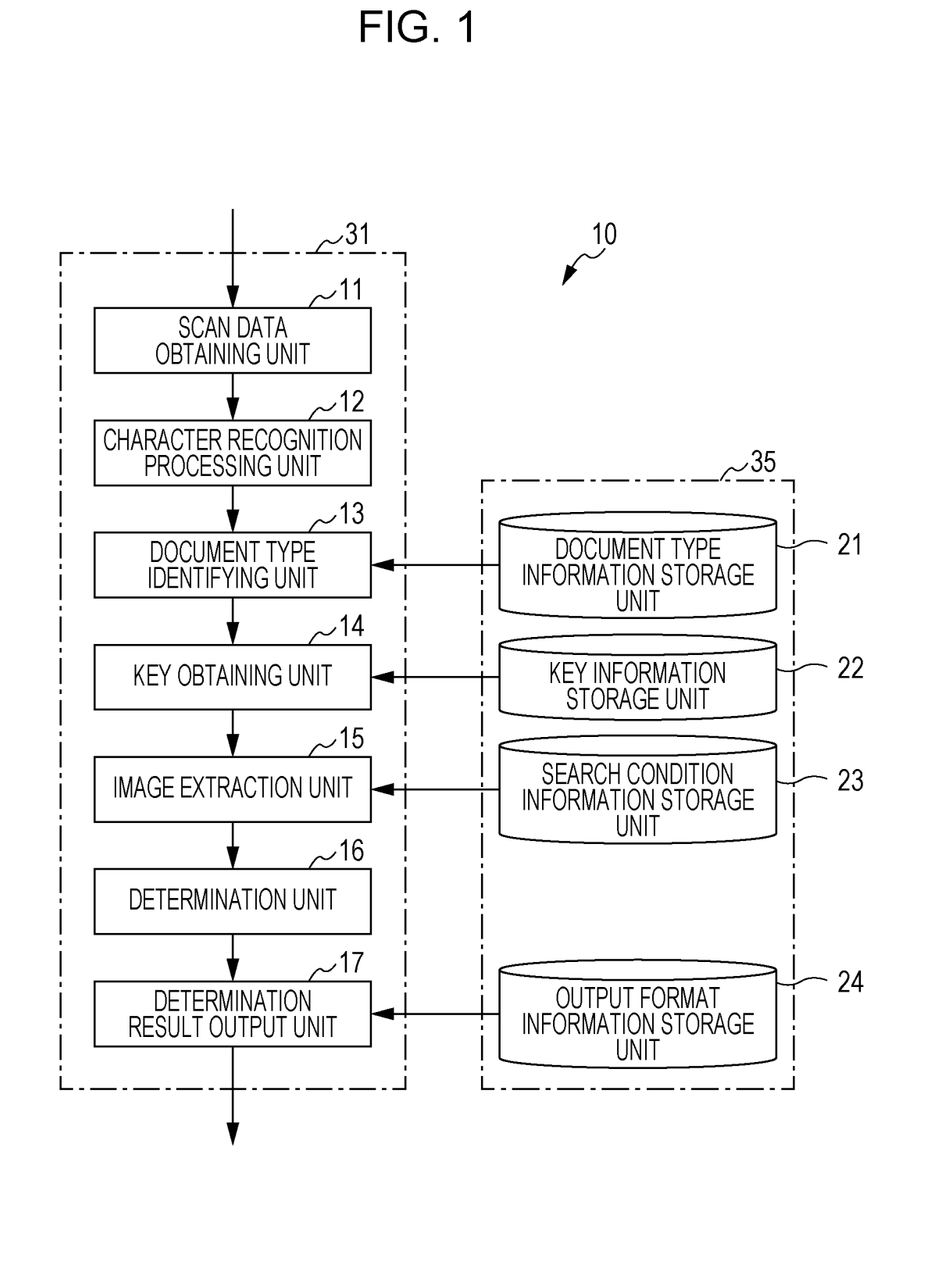
FIG. 1 is a block diagram of an information processing apparatus according to an exemplary embodiment of the present disclosure.

FIG. 1 is a block diagram of an information processing apparatus according to an exemplary embodiment of the present disclosure. This exemplary embodiment describes an image forming apparatus including a computer that is an information processing apparatus, by way of example.

Figure 2:
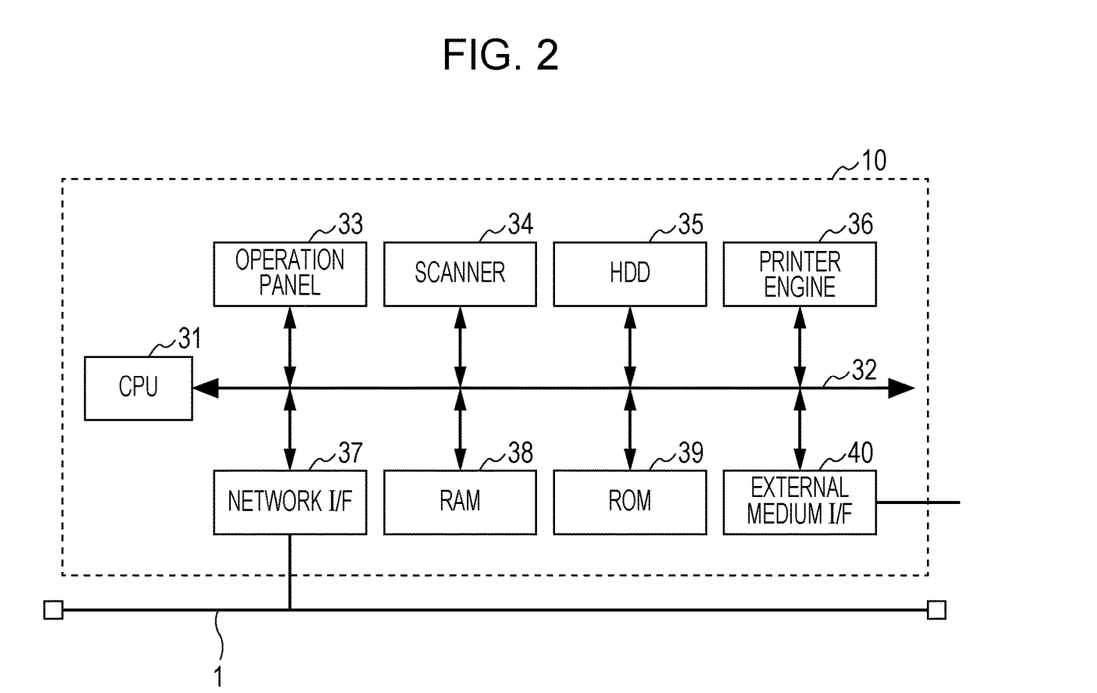
FIG. 2 is a hardware configuration diagram of an image forming apparatus according to the exemplary embodiment.

FIG. 2 is a hardware configuration diagram of an image forming apparatus 10 according to this exemplary embodiment. The image forming apparatus 10 may be implemented as a multi-function apparatus having various functions such as a copier function and a scanner function. In FIG. 2, a central processing unit (CPU) 31 controls the operation of various mechanisms mounted in the image forming apparatus 10, such as a scanner 34 and a printer engine 36, in accordance with a program stored in a read-only memory (ROM) 39. Various mechanisms to be controlled by the CPU 31 are connected to an address data bus 32 via which data is communicated. An operation panel 33 accepts instructions from a user and displays information. The scanner 34 reads a document set by the user. A hard disk drive (HDD) 35 stores an electronic document or the like read using the scanner 34. The printer engine 36 prints an image on an output sheet in accordance with an instruction from a control program executed by the CPU 31. A network interface (I/F) 37 is connected to a network 1 and is used for purposes such as transmitting electronic data generated by the image forming apparatus 10, receiving an electronic mail transmitted to the image forming apparatus 10, or accessing the image forming apparatus 10 via a browser. A random access memory (RAM) 38 is used as a work memory for executing a program or as a communication buffer for transmitting or receiving electronic data. The ROM 39 stores various programs for controlling the image forming apparatus 10 or transmitting or receiving electronic data. Various programs are executed to allow components described below to exert predetermined processing functions. An external medium interface (I/F) 40 is an interface with an external memory device such as a Universal Serial Bus (USB) memory or a flash memory. The image forming apparatus 10 according to this exemplary embodiment may have a hardware configuration similar to an existing configuration.

Referring back to FIG. 1, the image forming apparatus 10 according to this exemplary embodiment includes a scan data obtaining unit 11, a character recognition processing unit 12, a document type identifying unit 13, a key obtaining unit 14, an image extraction unit 15, a determination unit 16, a determination result output unit 17, a document type information storage unit 21, a key information storage unit 22, a search condition information storage unit 23, and an output format information storage unit 24. The components not described in this exemplary embodiment are not illustrated in the drawings.

The scan data obtaining unit 11 obtains scan data by reading a document using the scanner 34. The scan data is hereinafter also referred to as "read image". In this exemplary embodiment, the document may be a document in which a text character including a specific character and a specific image exist. The term "specific character" refers to a text character that is set for each type of document in association with a specific image that is to be contained in the document. In this exemplary embodiment, the specific character is referred to as "key". In this exemplary embodiment, an image of a seal affixed to the document is used herein as an example of the "specific image". A seal is a general term for printing stamps and impressions thereof that are used in place of signatures in documents or the like that require acknowledgement. Accordingly, the document used in this exemplary embodiment is to contain a seal affixed thereto. However, the document may sometimes fail to include the seal. To be exact, a paper document contains a seal affixed thereto, and an image obtained by reading the paper document contains an image of the seal affixed to the paper document. Accordingly, the image of the seal affixed to the paper document corresponds to the "specific image". However, a seal is sometimes described as corresponding to a specific image, for convenience of description.

The character recognition processing unit 12 performs character recognition using an optical character reader (OCR) function to extract a character string (i.e., text characters) from the read document. The document type identifying unit 13 identifies the type of the read document from the image of the read document. The key obtaining unit 14 refers to specific-character information, which is information regarding a specific character (i.e., a key) associated with a specific image (e.g., a seal) that is to be contained in the document, to obtain a key corresponding to the type of the document and associated with the seal that is to be contained in the document. The specific-character information is stored in the key information storage unit 22 as key information.

The image extraction unit 15 extracts from the read image an image that corresponds to the key obtained by the key obtaining unit 14 and that matches a search condition. Search condition information regarding the search condition is set in advance in the search condition information storage unit 23. The determination unit 16 determines whether the image is extractable by using the image extraction unit 15 to determine the presence or absence of a seal that is to be contained in the document in association with the key. The determination result output unit 17 outputs a determination result in accordance with the specified output format. Output format information regarding the output format is set in advance in the output format information storage unit 24.

Figure 3:
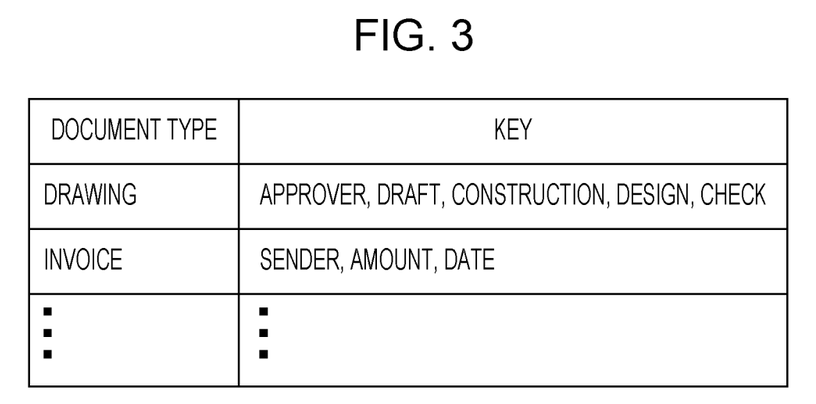
FIG. 3 illustrates an example data structure of key information stored in a key information storage unit according to the exemplary embodiment.

FIG. 3 illustrates an example data structure of the key information stored in the key information storage unit 22 according to this exemplary embodiment. The key information includes, for each type of document, one or more keys corresponding to the type of document.

Figure 4:
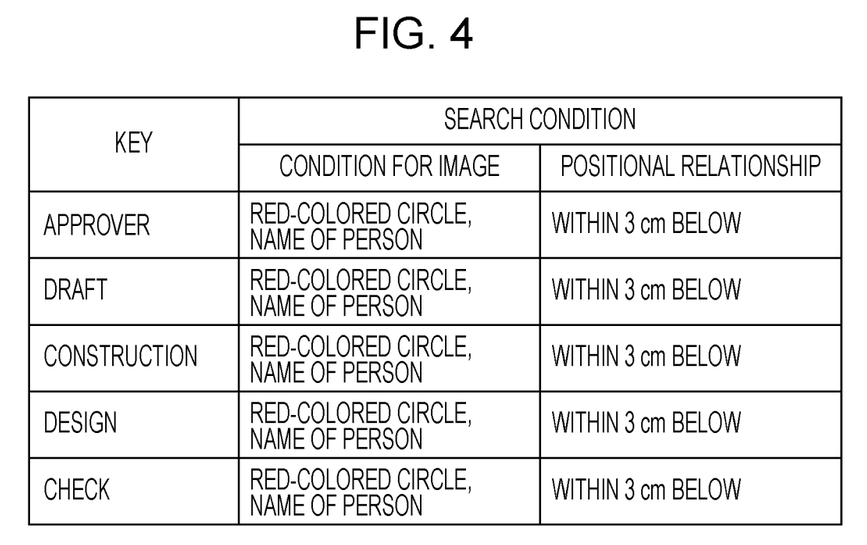
FIG. 4 illustrates an example data structure of search condition information stored in a search condition information storage unit according to the exemplary embodiment.

FIG. 4 illustrates an example data structure of the search condition information stored in the search condition information storage unit 23 according to this exemplary embodiment. The search condition information is set for each type of document. In FIG. 4, an example of search condition information that is set when the type of the document is a drawing is illustrated. In the search condition information, a search condition is set in correspondence with each of keys corresponding to the type of the document. The keys that are set when the type of the document is a drawing are, as exemplarily illustrated in FIG. 3, "approver", "draft", "construction", "design", and "check". As exemplarily illustrated in FIG. 4, when the type of the document is a drawing, a search condition is set for each of the key. Each of the respective search conditions corresponding to the keys includes conditions for the image and a positional relationship. The conditions for the image are conditions for identifying a seal that is to be contained in the document in association with the obtained key. The positional relationship is a positional relationship between the corresponding key and a seal that is to be contained in the document in association with the key. At least either the conditions for the image or the positional relationship may be included. While the same item value is set for the keys in the example settings illustrated in FIG. 4, a different search condition may be specified in accordance with the layout of the document. The conditions for the image may include a condition regarding at least one of a color or a shape included in the seal. In the example settings illustrated in FIG. 4, "red-colored circle" is used in which both red color and circle shape are included.

The document type information storage unit 21 and the output format information storage unit 24 will be described along with the operation.

The components 11 to 17 of the image forming apparatus 10 are implemented by a cooperation of a computer in the image forming apparatus 10 and programs operating on the CPU 31 mounted in the computer. The storage units 21 to 24 are implemented in the HDD 35 mounted in the image forming apparatus 10. Alternatively, the RAM 38 or an external storage means may be used via a network.

The programs used in this exemplary embodiment may be provided via a communication means or may be provided by being stored in a computer-readable recording medium such as a compact disc read-only memory (CD-ROM) or a USB memory. The programs provided via a communication means or a recording medium are installed in a computer, and a CPU in the computer sequentially executes the programs to implement various processing operations.

The document used in this exemplary embodiment includes a seal that is affixed to the document such that the position at which the seal is affixed may differ depending on the type of the document or the form of the document. However, the document may sometimes fail to include the seal, and such a document may not be handled as an official document. Accordingly, this exemplary embodiment determines whether each document contains a seal without opening each individual document file.

Next, the operation according to this exemplary embodiment will be described. The following describes a process for determining the presence or absence of a specific image (e.g., a seal) according to this exemplary embodiment with reference to a flowchart illustrated in FIG. 5.

Figure 5:
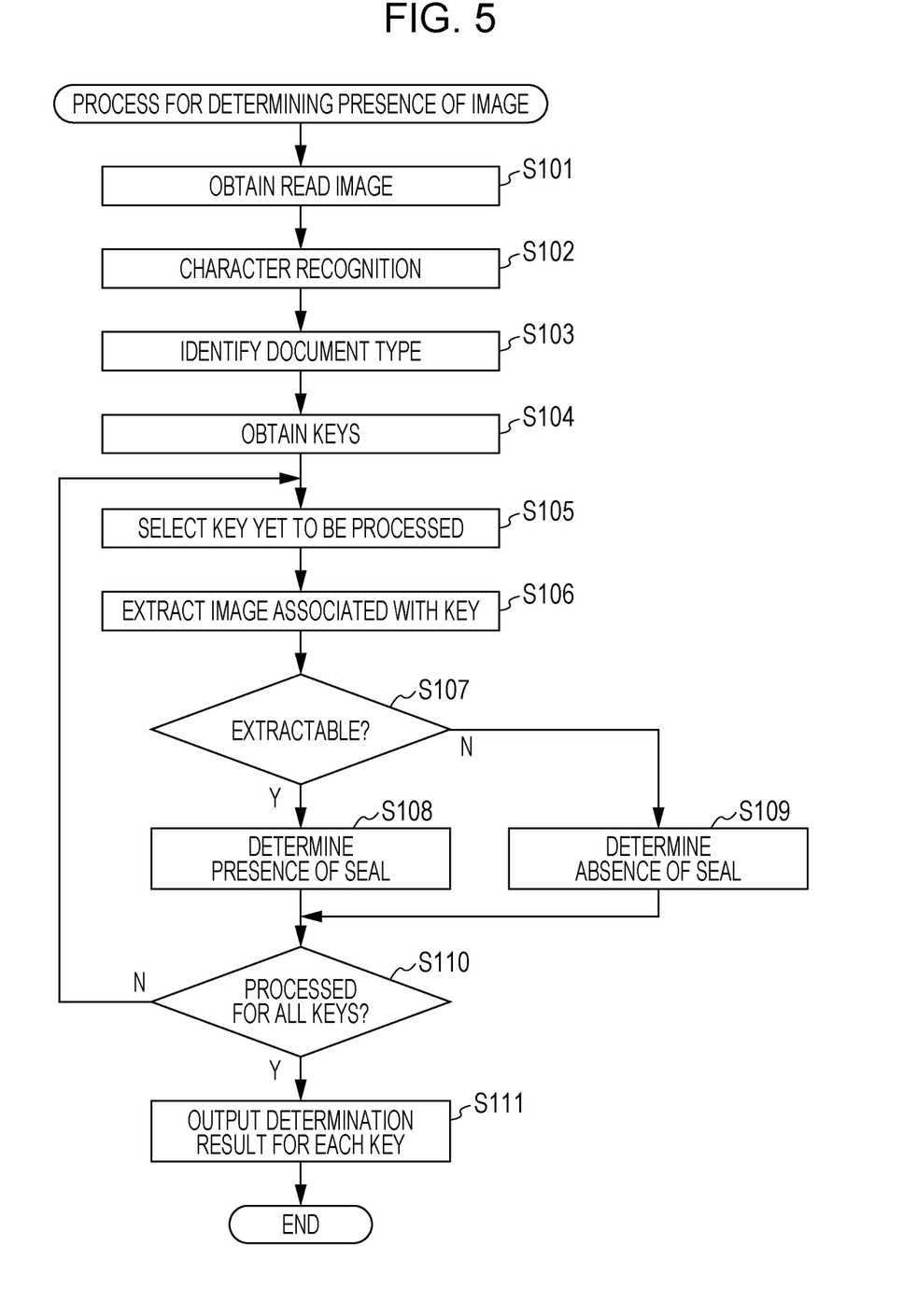
FIG. 5 is a flowchart illustrating a process for determining the presence or absence of an image according to the exemplary embodiment.

First, when a user uses the scanner 34 to read a document to be processed, the scan data obtaining unit 11 obtains a read image of the document (step S101). Then, the character recognition processing unit 12 performs character recognition using the OCR function to extract a character string from the read document (step S102). When the character recognition processing unit 12 performs OCR, pre-processing may be performed, such as correct positioning of the read image or cleansing for removing the background color.

Then, the document type identifying unit 13 identifies the type of the document (step S103). Specifically, the document type identifying unit 13 identifies the type of the document by using any of the following exemplified techniques.

In the first technique, for example, when the document has a data code such as QR code (registered trademark) for identifying the form of the document or identification information of the document, the document type identifying unit 13 reads the data code. In this case, the document type information storage unit 21 stores document type information indicating correspondences between data codes and document types. The document type identifying unit 13 matches the data code obtained from the read image against the data codes included in the document type information to identify the type of the document.

In the second technique, the document type identifying unit 13 analyzes the read image of the document, in particular, the layout of the document, to identify the type of the document by estimation. For example, the document type identifying unit 13 detects the positions of ruled lines on the document, obtains the layout of the ruled lines, and estimates the type of the document from the layout of the ruled lines. Alternatively, when ruled lines form a table, the document type identifying unit 13 extracts the names of the items included in the table. In this case, the document type information storage unit 21 stores document type information indicating correspondences between document types and lists of item names in a table. The document type identifying unit 13 matches a list of item names in a table obtained from the read image against the lists of item names included in the document type information to identify the type of the document by estimation on the basis of the rate of match in the item names or the like.

In the third technique, the document type identifying unit 13 analyzes the read image of the document to extract a document name from the document. A typical document contains its document name at the top of the document or at the center in an upper portion of the document. In some cases, the document name is enclosed in parentheses or is written in a larger font size. Accordingly, the document type identifying unit 13 estimates that a character string having such a feature is the document name, and extracts the character string. In this case, the document type information storage unit 21 stores document type information indicating correspondences between document types and document names. The document type identifying unit 13 matches the document name obtained from the read image against the document names included in the document type information to identify the type of the document by estimation.

In the fourth technique, when using the scanner 34 to read a document, the user specifies the type of the document. More specifically, when the scan data obtaining unit 11 reads a document, the document type identifying unit 13 causes the operation panel 33 to display an input screen for inputting the type of the document, and prompts the user to input the type of the document on the input screen. Alternatively, the document type information storage unit 21 stores selectable candidate document types. When the scan data obtaining unit 11 reads a document, the document type identifying unit 13 causes the operation panel 33 to display a selection screen for selecting the type of the document. The selection screen displays the document types read from the document type information storage unit 21 in list view. The document type identifying unit 13 identifies the type of the document that is selected by the user.

When the document type identifying unit 13 identifies the type of the document by using any technique, the key obtaining unit 14 obtains keys set for the identified type of the document from the key information storage unit 22 (step S104). In the example settings illustrated in FIG. 3, when the type of the document identified by the document type identifying unit 13 is a drawing, the key obtaining unit 14 obtains "approver", "draft", "construction", "design", and "check" from the key information storage unit 22.

Then, the image extraction unit 15 repeatedly executes the following process for each of the obtained keys. First, one of the keys yet to be subjected to the following process is selected (step S105). The keys may be selected in any order. Then, the image extraction unit 15 matches the selected key against the character string obtained in the character recognition processing executed in step S102 to identify the position of the key on the document. The result of the character recognition processing executed in step S102 may not be used, and the character recognition processing may be executed again at this time. Then, the image extraction unit 15 obtains, from the search condition information storage unit 23, a search condition for which the type of the document is a drawing and that corresponds to the key to be processed. For example, when the key is "approver", the image extraction unit 15 identifies the position where the character "approver" is printed on the document. Then, the image extraction unit 15 extracts an image that is red in color and circular in shape (i.e., a round image) and that is within 3 cm below the position where the key "approver" is printed on the document according to the example settings of the search condition illustrated in FIG. 4 (step S106). Then, the image extraction unit 15 confirms that the name of a person is shown in the image. In this exemplary embodiment, any character string inside a circle is estimated to be the name of a person. Alternatively, a biographical dictionary or the like may be referenced to precisely verify that the character string is an actual person's name rather than a company name or a date.

The determination unit 16 refers to the image extracted by the image extraction unit 15 and determines the presence or absence of a seal associated with the key in the document. That is, if it is determined that an image that matches the search condition is extractable by using the image extraction unit 15 (Y in step S107), the determination unit 16 determines that the image is a seal, and determines the presence of a seal (step S108). On the other hand, if the image extraction unit 15 fails to extract an image that matches the search condition (N in step S107), the determination unit 16 determines the absence of a seal (step S109).

Figure 6:
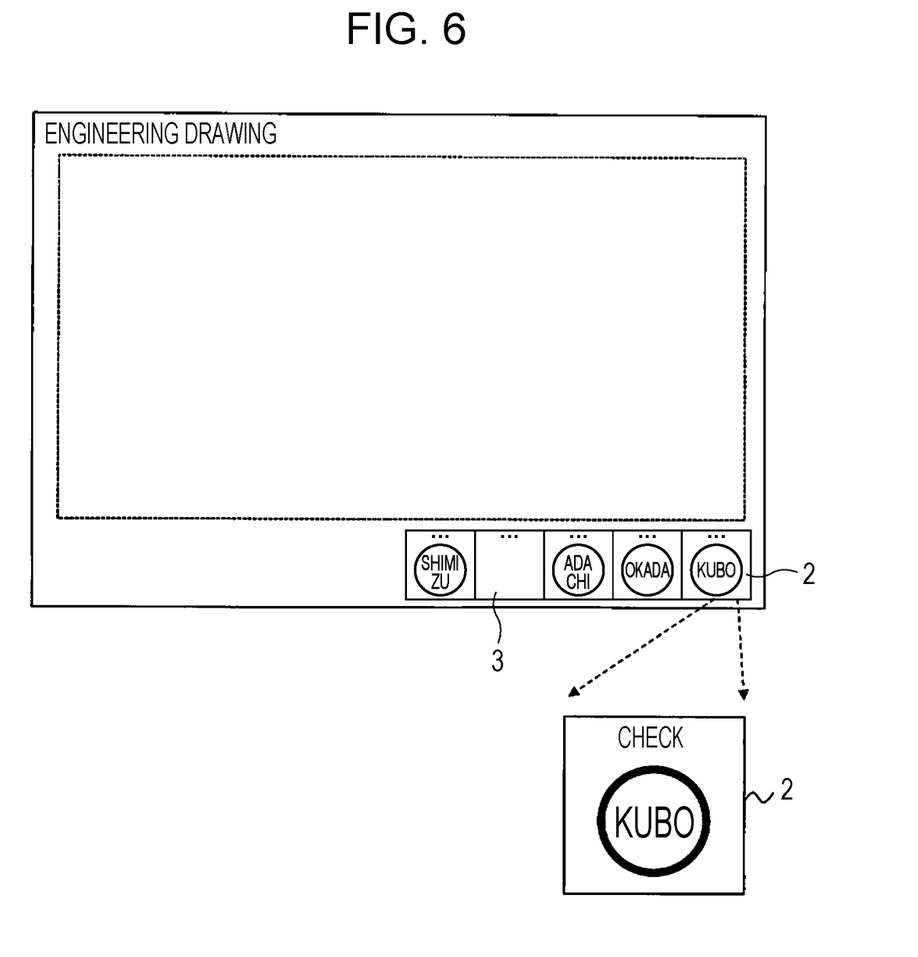
FIG. 6 schematically illustrates the layout of a document whose type is classified into a drawing according to the exemplary embodiment.

FIG. 6 schematically illustrates the layout of a document whose type is classified into a drawing. In FIG. 6, the document has in a right lower portion thereof predetermined signature/seal fields to which persons in charge of supervision affix their seals. Each of the signature/seal fields has a key printed in an upper portion thereof. Users are able to identify the positions to which the users affix their seals by using the keys. The signature/seal fields illustrated in FIG. 6 include signature/seal fields 2 that are filled with seals, and a signature/seal field 3 that is not filled with a seal. Seals are to be affixed to the document at positions that are set with reference to the sizes of the signature/seal fields, for example, within 3 cm below from the positions where the respective keys are printed. Accordingly, if an image is shown as in the signature/seal fields 2, the presence of a seal is determined. On the other hand, if no image is shown as in the signature/seal field 3 (corresponding to that associated with the key "draft"), the absence of a seal is determined.

Processing is performed on keys yet to be subjected to the process described above in a similar way (N in step S110, and steps S105 to S109). If the process has been executed on all the keys obtained by the key obtaining unit 14 (Y in step S110), the determination result output unit 17 presents a determination result indicating the presence or absence of a seal for each key, which is obtained by the determination unit 16 (step S111). Specifically, the determination result output unit 17 outputs a determination result using any of the following exemplified output formats.

In the first output format, the determination result is included in the file name of the document. The output format information stored in the output format information storage unit 24 defines naming rules for document files. For example, the output format information may define a naming rule in which a file name includes a combination of a key and a determination result indicating the presence or absence of a seal that is to be contained in association with the key, such as "original file name+key+determination result". In this case, if the original file name is "ABC", the key is "approver", and the presence of a seal is determined, then, the document file is named "ABC_approver_yes" according to the naming rule. If the original file name is "ABC", the key is "draft", and the absence of a seal is determined, then, the document file is named "ABC_draft_no". The symbol "_" denotes a delimiter that separates item values from each other. Any other delimiter may be used. Alternatively, no delimiter may be included in a file name. In the case of a plurality of keys, a plurality of combinations each including a key and a determination result indicating the presence or absence of a seal that is to be contained in association with the key are included in a file name, such as "ABC_approver_yes_draft_no_. . . ".

As described above, a determination result included in a file name of a document may allow a user to determine a determination result indicating the presence or absence of a seal without opening the document to see the contents of the document.

In the second output format, a file including the determination result is generated. The output format information stored in the output format information storage unit 24 defines the generation of a file including a combination of a key and a determination result indicating the presence or absence of a seal that is to be contained in association with the key. This file is hereinafter referred to as "determination result file". As described above, a file name including a combination of a key and a determination result may be long if the number of keys is large. The second output format may avoid an increase in the length of a file name. To determine a determination result, a determination result file may have to be opened. However, a determination result file including determination results for a plurality of documents eliminates the need to individually open a plurality of document files. It is only required to open the single determination result file to determine the determination results for the plurality of documents. The generation of a determination result file separately from document files may be useful for the management of the presence or absence of seals. The determination result file may be generated as a comma-separated values (CSV) file, for example. To generate a determination result file shared by a plurality of documents, it is desirable to register document names in the determination result file in association with the respective keys and determination results.

The third output format is substantially the same as the second output format. In the second output format, the determination result "yes" or "no", which indicates the presence or absence of a seal, is included in the determination result file, whereas in the third output format, when a determination result indicates the presence of a seal, an image of the seal is included in the file. That is, if an image that matches a search condition for a key is contained, the image is regarded as a seal and is extracted from the read image of the document. A combination of the key and the seal associated with the key is included in the file. The file allows a user to determine not only the presence or absence of a seal but also, in the case of the presence of a seal, see the seal. The file also notifies the user that, if a different image is erroneously extracted as a seal, the extracted image is incorrect. If no seal image is contained, there is no image associated with the key, which provides a determination result indicating the absence of a seal.

The setting of search conditions will now further be described.

The search condition information storage unit 23 stores search condition information in advance. In this exemplary embodiment, three methods are provided for setting a search condition to be included in the search condition information.

Figure 7:
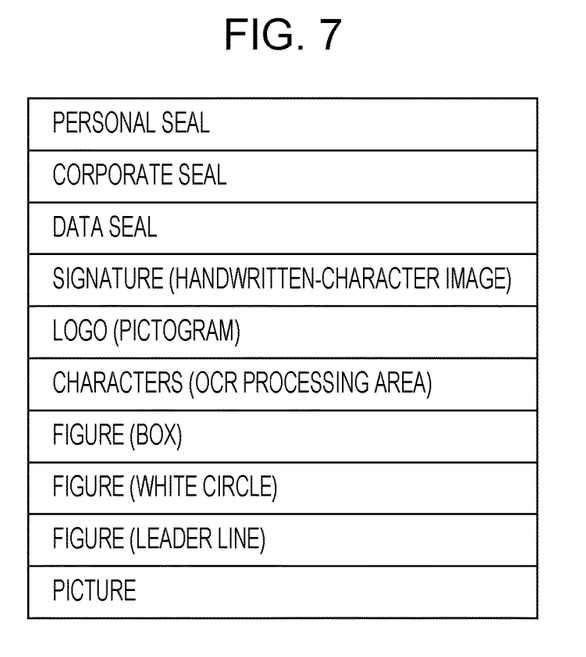
FIG. 7 illustrates search conditions provided in advance according to the exemplary embodiment.

In the first method, conditions available as search conditions are created in advance (the conditions are also referred to as "preset search conditions"), and a search condition is selected from among the preset search conditions. FIG. 7 illustrates preset search conditions. In each of the preset search conditions, substantially general-purpose conditions are set in combination. For example, in the search condition "data seal", specific conditions, such as the seal having a round outer periphery, the inside of the round outer periphery being divided into three stages, and the middle stage including a date, are set in advance. If these specific conditions are acceptable, the user may select the preset search condition "data seal" as a search condition. This may eliminate the need for the user to individually select detailed conditions, such as the seal having a round outer periphery, and lead to efficient setting of search conditions.

Figure 8:
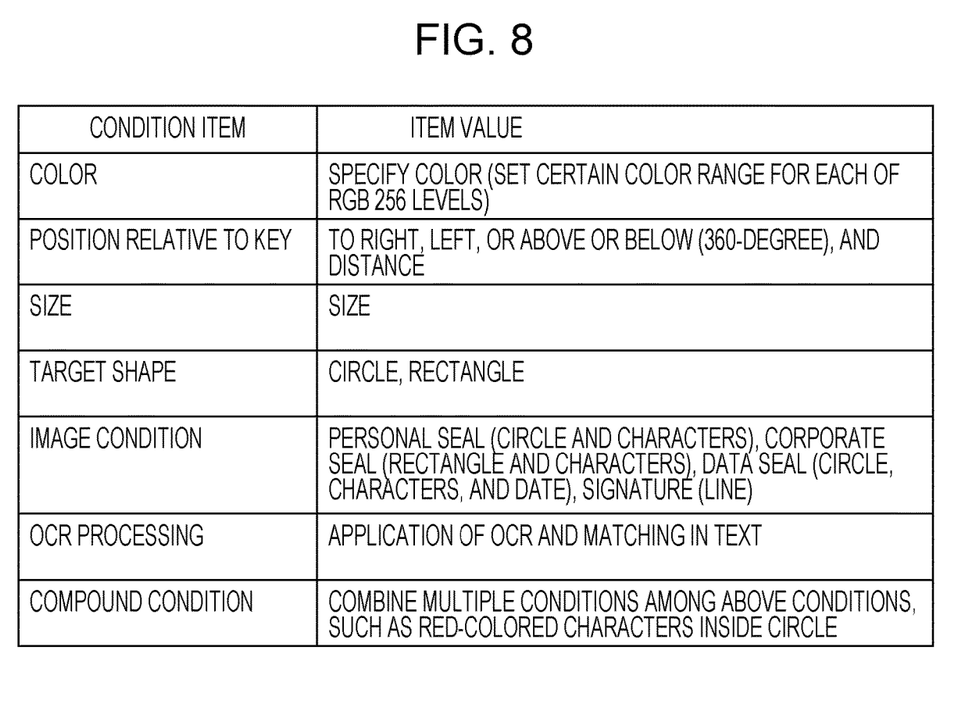
FIG. 8 illustrates an example of individually setting search conditions according to the exemplary embodiment.

In the second method, search conditions are individually set. Whereas the first setting method does not allow individual setting of specific search conditions, the second setting method allows individual setting of specific search conditions. FIG. 8 illustrates an example of individually setting search conditions. Examples of the condition items that are set include a color and a position relative to a key, and the condition items may be set for each seal. The example settings illustrated in FIG. 4 are based on this setting method.

In the third method, search conditions are set in more detail. Examples of the items for the search conditions that are set may be similar to those illustrated in FIG. 7, and the search conditions are set in more detail. For example, when the key is "approver", a supervisor in a somewhat important position is an approver and takes responsibility. For the key "approver", therefore, an image of an impression of the supervisor's seal is registered in advance in the search condition "personal seal". Accordingly, if a seal authorized for a certain key is specified, an image of an impression of the seal is registered in advance, thereby obtaining a more accurate determination result. That is, even if an image estimated to be a seal is located near the key "approver", the determination result indicates the absence of a seal if the image does not match the registered image of the impression of the supervisor's seal.

As described above, this exemplary embodiment identifies a type of a document from a read image of the document, obtains a key corresponding to the identified type of the document, estimates an image located near the key to be a seal associated with the key, depending on the setting of the search condition, and obtains a determination result indicating the presence of a seal. Accordingly, in this exemplary embodiment, a type of document may be identified. If a key associated with a seal is identified, the presence or absence of a seal may be determined. Thus, this exemplary embodiment is applicable to any form of document. That is, this exemplary embodiment is not affected by the form of document. It may be possible to obtain a determination result indicating the presence or absence of a seal without individually dealing with a multiplicity of forms of documents.

A document may contain a plurality of character strings each of which is the same as a key. In this case, a condition for identifying a key associated with a seal may be set in advance to make a character string automatically selectable from among the plurality of character strings. Alternatively, the user may select a character string.

In the foregoing description, a seal is used as a non-limiting example of a specific image. Examples of the specific image include a variety of images such as a logo, a picture, and a map. The determination of the presence or absence of a picture or a drawing is taken as an example. In this case, a key may be set as characters included in the caption of the picture or drawing, such as "FIG. 1:", more specifically, a character string including a sequence of three elements: (i) the character "Figure", (ii) a number, and (iii) a colon, and whether a picture or a drawing is located near (to the right or left or above or below) the key may be determined as a value. The presence or absence of a picture or a drawing may be determined using any existing area determination technique. Not only the presence or absence of a picture or a drawing but also whether the picture or the drawing is associated with characters constituting a key, examples of which include whether the picture or the drawing indicates the content of the key, may be determined by, for example, extracting characters for an explanation that may be included in the caption of the picture or drawing, and determining the presence or absence of a picture or a drawing corresponding to the characters for the explanation. In this case, for example, a picture or a drawing associated with characters extracted as the characters for the explanation may be determined in advance. Alternatively, a sentence describing the picture or the drawing using characters may be generated by using artificial intelligence or the like from the elements and the like of the picture or the drawing, and the degree of match with the sentence may be determined. In a specific example, the caption of a picture describes "Picture 1: dog", and "dog" is set as a key. In this case, a picture located near (preferentially above or below, as a rule) the caption may be extracted using an existing image processing technique, and the extracted picture may be input to artificial intelligence for determining the content of the picture to obtain a determination result indicating whether the picture is a picture of a dog. Alternatively, after obtaining a determination result indicating the content of the picture, it may be determined whether the picture is a true picture of a dog. A map is taken as another example. When the caption contains "FIG. 1: a map of Tokyo", in response to extraction of the character "Tokyo" as a key, it may be determined whether the map image includes the character "Tokyo" or the names of places related to Tokyo (e.g., the names of places in Tokyo, such as Ginza or Roppongi) to determine whether a correct map is placed. Accordingly, in some exemplary embodiments of the present disclosure, it is determined whether a specific image corresponding to a character of characters constituting a key is arranged. It should be understood that the specific image is not limited to a seal. Additionally, the determination of whether a specific image is arranged includes the determination of whether a specific image is arranged, regardless of the content of the image, and the determination of whether the content of the image is related to a key.

In this exemplary embodiment, a read image of a document is used, and the image forming apparatus 10 has been described as an information processing apparatus, by way of example without limitation. The information processing apparatus may be implemented as a computer such as a general-purpose personal computer (PC) that receives and processes a read image of a document.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor configured to:
   identify a type of a target document to be processed from a read image obtained by reading the target document;
   refer to specific-character information, the specific-character information being information on a specific character set for each type of document in association with a specific image that is to be contained in the document, to obtain a specific character corresponding to the type of the target document and associated with a specific image that is to be contained in the target document; and
   determine whether an image that matches a search condition set in advance for the obtained specific character is extractable from the read image, to determine a presence or absence of a specific image that is to be contained in the target document in association with the obtained specific character,
   wherein the processor is configured to present a determination result indicating a presence or absence of the specific image that is to be contained in the target document in association with the obtained specific character,
   wherein the processor is configured to present a file name of the target document, the file name includes a combination of the obtained specific character and the determination result.

2. The information processing apparatus according to claim 1, wherein the processor is configured to generate a file including a combination of the obtained specific character and a determination result indicating a presence or absence of the specific image that is to be contained in the target document in association with the obtained specific character.

3. The information processing apparatus according to claim 1, wherein the processor is configured to:
   extract, as the specific image that is to be contained in the target document in association with the obtained specific character, an image that matches the search condition set in advance for the obtained specific character and that is extractable from the read image; and
   generate a file including a combination of the obtained specific character and the extracted image.

4. The information processing apparatus according to claim 1, wherein the search condition includes at least one of a condition for identifying the specific image that is to be contained in the target document in association with the obtained specific character, or a condition indicating a positional relationship between the obtained specific character and the specific image that is to be contained in the target document in association with the obtained specific character.

5. The information processing apparatus according to claim 4, wherein the condition for identifying the specific image includes a condition concerning at least one of a color or a shape included in the specific image.

6. A non-transitory computer readable medium storing a program causing a computer to execute a process for information processing, the process comprising:
   analyzing a read image obtained by reading a target document to be processed to identify a type of the target document;
   referring to specific-character information in which a specific character is set for each type of document in association with a specific image that is to be contained in the document, to obtain a specific character corresponding to the type of the target document and associated with a specific image that is to be contained in the target document;
   determining whether an image that matches a search condition set in advance for the obtained specific character is extractable from the read image, to determine a presence or absence of a specific image that is to be contained in the target document in association with the obtained specific character;
   presenting a determination result indicating a presence or absence of the specific image that is to be contained in the target document in association with the obtained specific character; and
   presenting a file name of the target document, the file name includes a combination of the obtained specific character and the determination result.

7. An information processing method comprising:
   identifying a type of a target document to be processed from a read image obtained by reading the target document;
   referring to specific-character information, the specific-character information being information on a specific character set for each type of document in association with a specific image that is to be contained in the document, for obtaining a specific character corresponding to the type of the target document and associated with a specific image that is to be contained in the target document;
   determining whether an image that matches a search condition set in advance for the obtained specific character is extractable from the read image, for determining a presence or absence of a specific image that is to be contained in the target document in association with the obtained specific character;
   presenting a determination result indicating a presence or absence of the specific image that is to be contained in the target document in association with the obtained specific character; and
   presenting a file name of the target document, the file name includes a combination of the obtained specific character and the determination result.

* * * * *